Dec. 28, 1954　　L. F. POLK ET AL　　2,697,964
MACHINE TOOL

Filed Dec. 26, 1947　　3 Sheets-Sheet 1

INVENTORS.
Louis F. Polk
Ernest A. Clark
BY
Edward J. Noip
atty.

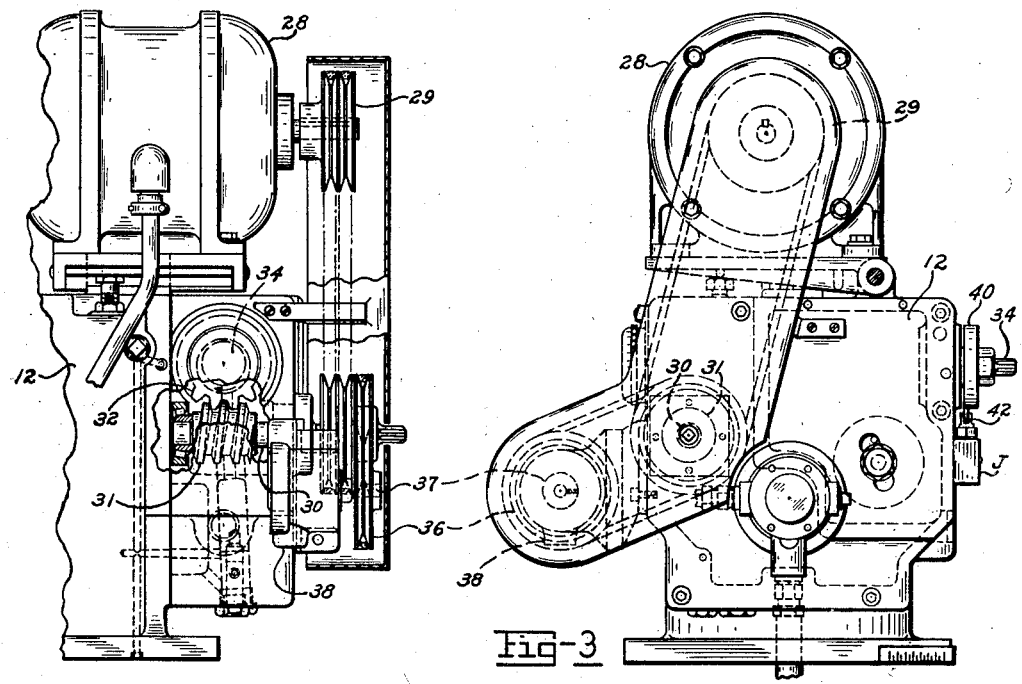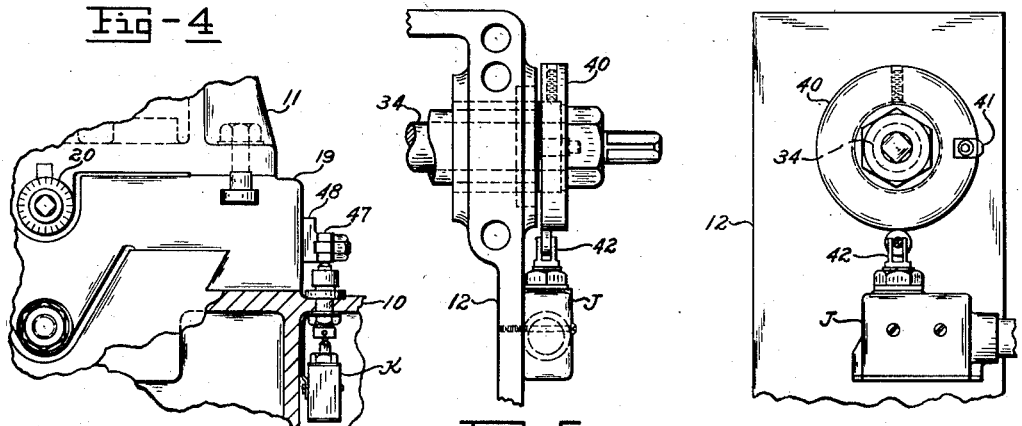

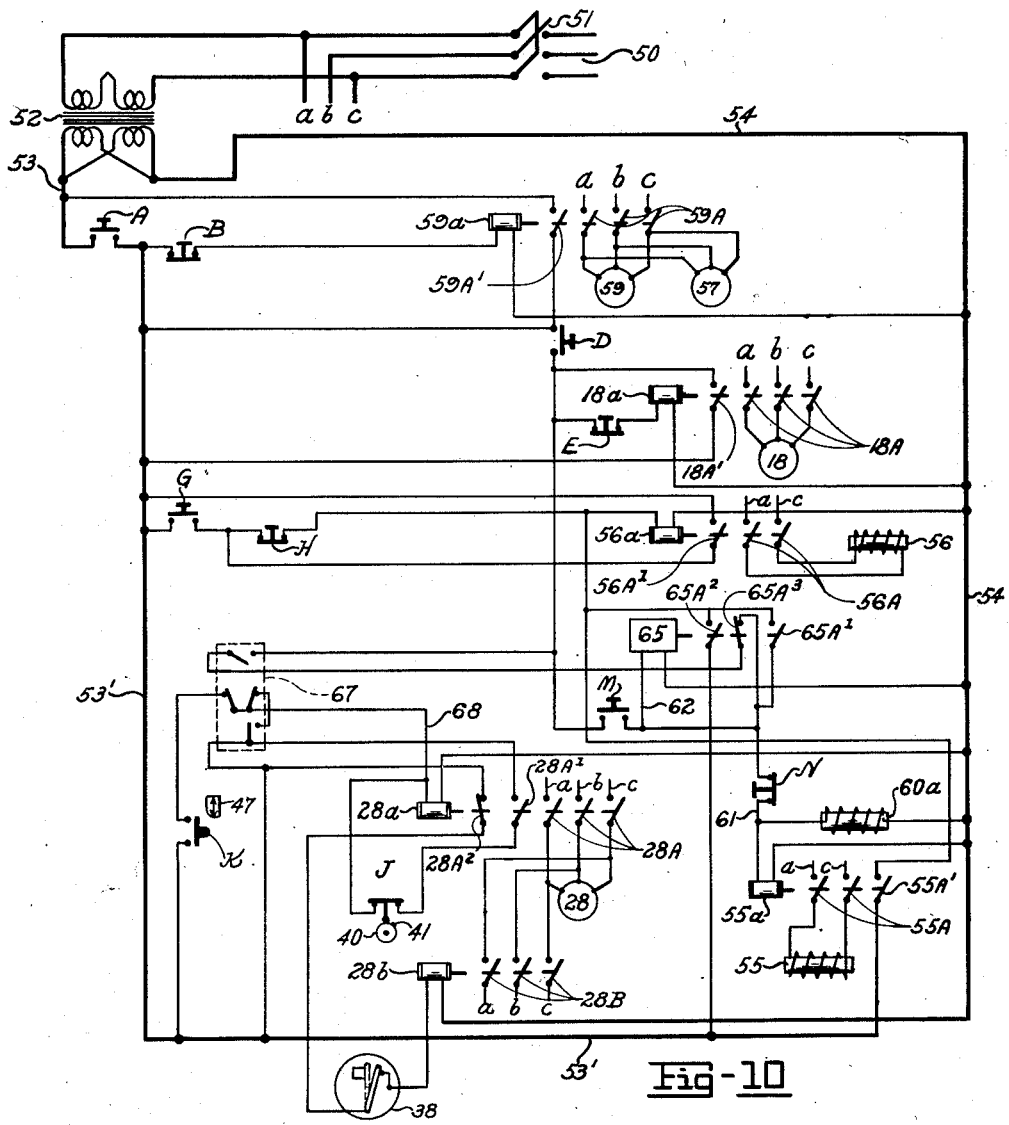
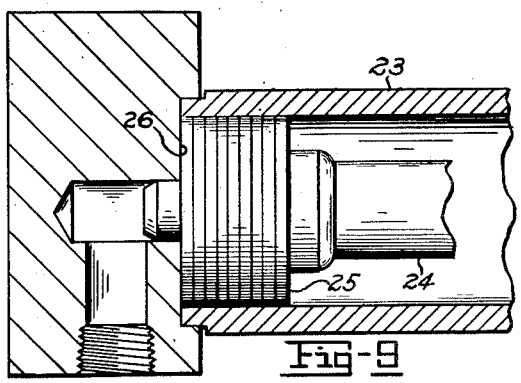

United States Patent Office 2,697,964
Patented Dec. 28, 1954

2,697,964

MACHINE TOOL

Louis F. Polk and Ernest A. Clark, Dayton, Ohio, assignors to The Sheffield Corporation, Dayton, Ohio, a corporation of Ohio Application December 26, 1947, Serial No. 793,986

6 Claims. (Cl. 90—1.4)

This invention relates to gear shaping or chamfering machines.

One object of the invention is the provision of a gear shaping or chamfering machine for cutting the ends of gear teeth in which there is provision preventing the tool and the work being brought into engagement at such time in the cycle that a heavy cut can take place, thus relieving the tool from undue strain in its initial cutting operation.

Another object is the provision of a gear shaping or chamfering machine for shaping the ends of gear teeth by a milling cutter of the hollow mill type or pencil type, having a work drive which is automatically energized upon completion of the movement of the cutter head to a predetermined work engaging position.

Another object is the provision of a machine of the character mentioned having means timed with relation to the work drive for automatically stopping the work at a predetermined position in its cycle of movements so that the cutter when subsequently brought into engagement with another workpiece similarly positioned on the work head will not be subjected to undue cutting strain.

Another object is the provision of a gear shaping or chamfering machine having a power drive for rotating a workpiece and a cutter for operating on the workpiece, with provision for clamping the workpiece on the work spindle with the gear teeth mounted in a predetermined position with respect to the work spindle, there being provision to prevent operation of the work head drive until the work has been clamped and the cutter spindle is in operation.

Other objects and advantages of the invention will be apparent from the following description, the appended claims and the accompanying drawing, in which Fig. 1 is a top plan view of a gearing shaping machine embodying the present invention;

Fig 3 is a rear elevation of the work head;

Fig. 4 is a side elevation of a portion of the work head;

Figs. 5 and 6 are details of the timing switch and its control cam operated by the work head drive;

Fig. 7 is an end view of a portion of the cutter head showing the switch that controls the work head drive;

Fig. 8 is a rear elevational view of the switch shown in Fig. 7;

Fig. 9 is an enlarged view of a portion of the cutter head positioning means; and Fig. 10 is a diagrammatic showing of the electrical connections.

Figures 1, 2:
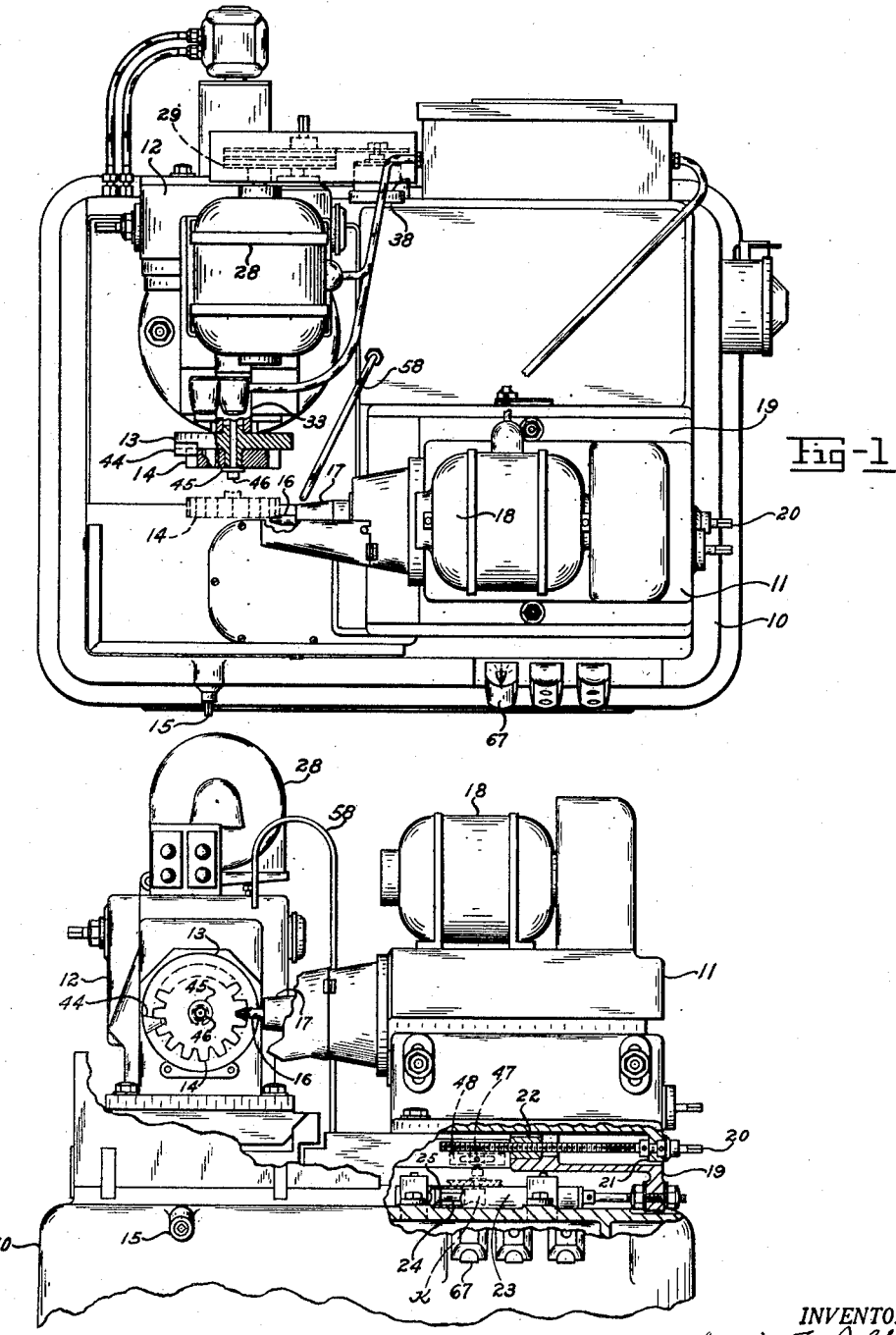
Fig. 2 is a front elevation of the machine showing a portion of the cutter head adjustment control in section.

In the drawing the invention is shown in its relation to a gear chamfering machine employing a pencil cutter for rounding or chamfering the ends of gear teeth, the machine incorporating drive means for operating the cutter spindle and the work head, as more fully disclosed in the prior U. S. Patent 2,254,312, granted September 2, 1941. It should be understood, however, that the invention in its broader aspects may be equally applicable to chamfering machines in which other means are employed for timing the tool and work movements.

As shown, the machine essentially comprises a main supporting frame 10 on which is a cutter head 11 and a work head 12. The work head is provided with a spindle having a work carrying flange 13 on which the workpiece such as a gear 14 can be readily fixed. The entire work head is adjustable axially of the spindle by an adjustment shaft 15 in setting up the machine for any particular gear so that the work will normally be positioned as indicated in dotted lines in Fig. 1. In this position the forward ends of the gear teeth may be shaped, rounded or chamfered by means of a rotatable milling cutter 16 carried by the cutter head, so that the gear may be readily meshed with a mating gear.

The cutter head 11 comprises a cutter spindle 17 on which the pencil shaped cutter 16 is detachably mounted. This spindle is rotatably suported and is rotated by means of an electric motor 18. The cutter head 11 is mounted for axial adjustment on the slide 19 by means of a threaded shaft 20 rotatably arranged in a depending lug 21 of the cutter head and engaging an internally threaded thrust block 22 carried by slide 19 so that the cutter may be placed in a desired position in accordance with the particular gear tooth characteristics of the work Slide 19 is horizontally movable on the frame 10 by means of a fluid pressure cylinder 23 carried by the frame and containing a piston rod 24 carried by slide 19 as shown in Fig. 2. On the end of the piston rod is a piston 25 and there are suitable means for controlling the supply of fluid to one or the other of the cylinder ends to cause the slide 19 to advance to the left or return to the right as shown in Fig. 2. Movement towards the left advances the cutter axially into work engaging position, the left hand limit of movement of the slide being determined by a stop wall 26 at the end of the cylinder, contacted by the end of the piston when fluid is supplied to the right hand end of the cylinder.

The work head spindle is adapted for endwise and rotational movements by mechanism more fully disclosed in U. S. Patent 2,254,312. Thus the work head drive motor 28 operating through pulley 29 drives a shaft 30 on which is a worm wheel 31 meshing with a gear 32 on a shaft 34. The shaft 34 is provided with mechanism for rotating the spindle 33 and for moving the spindle shaft back and forth in an axial direction and in timed relation with its rotation to turn the gear during chamfering and maintain a proper engagement of the gear with the cutter spindle to accomplish the desired chamfering operation.

The shaft 30 is connected through a belt drive to pulley wheel 36 on shaft 37 which carries zero speed switch 38 arranged in a suitable housing and adapted to close a switch when the direction of rotation of shaft 37 is normal and open the switch upon reverse rotation. The function of this switch will be more fully described although brief mention is made now of the fact that it is employed in electric circuits in conjunction with electrical reversing means for motor 28 so that the motor may be stopped practically instantly by temporarily reversing its power supply connections.

Arranged on the shaft 34, which forms a part of the work head drive mechanism is a cam plate 40 having a cam 41 controlling a limit switch J which is preferably normally closed and temporarily opened when the cam 41 engages the roller on the switch operating plunger 42. The shaft 34 is so operated as to make one complete revolution during the time the work spindle rotates far enough to advance the work one tooth so that each time a new tooth is operated upon the switch J will be opened. This switch is employed in a circuit which is normally maintained ineffective to stop the motor 28, but at the proper time in the sequence of operation, and after a complete cycle of the work has taken place, the circuit in which the switch J is arranged is conditioned so that the motor 28 will be deenergized and stopped as soon as the switch J opens. Thus the work is stopped so that the gear teeth on the work are in a predetermined definite location with respect to the cutter axis. As the work is located on the work spindle hub by means of a locating ear or lug 44 engaged between two adjacent teeth on the gear, the work may be so stopped that the cutter spindle axis is between two teeth of the gear, where it is not actually cutting or where it is doing a minimum of cutting action. With the work stopped in this position it will be apparent that another work piece may be applied in place of the finished gear, the cutter spindle being retracted by applying fluid pressure to the left hand side of piston 25 at this time, and thus when the cutter spindle is again advanced to the work it will enter between a pair of gear teeth instead of immediately taking a large cut. The cutter spindle will thus complete its axial advance before it is called upon to do any substantial cutting action on the work. It is pointed out that in the absence of such an arrangement the rapidly rotating milling cutter might advance into the end of a gear tooth as it travels axially into cutting position and thus be subjected to severe cutting strain which might damage even a steel cutter and which would be particularly objectionable in the case of carboloy cutters which due to their brittleness would be very liable to be broken, or at least severely damaged.

When a new workpiece is loaded it is applied to the work head spindle flange 13 and clamped under the control of the operator preferably by means of an electrical switch which through a solenoid valve operates fluid pressure means to move a clamping rod 46 and draw up a U-shaped clamp washer 45, thus securing the work to the work holding flange 13. During loading, with the cutter head retracted, the operator controls an electric switch to start rotation of the cutter spindle 17. Under the control of another switch the cutter head is advanced by means of the fluid pressure moving means until the cutter reaches its operating position in which it is shown in Figs. 1 and 2. At this time the gear is stationary, but immediately upon movement of the cutter spindle into cutting position the work head drive is automatically started and the work head spindle is rotated and moved back and forth axially so that the gear teeth are successively cut or rounded. The means for initiating the work head drive is an automatic manner, as shown, comprises a limit switch K carried by the frame 10 as shown in Figs. 7 and 8, controlled by a lug 47 on the slide 19. This lug is adjustable lengthwise of the slide in a carrying bracket 48 on the slide as shown in Figs. 7 and 8. The switch K is normally open but is closed as soon as the slide 19 reaches the limit of its advancing travel into working position. This switch K thus energizes the work head drive, and movements of the workpiece will not take place until the cutter is fully advanced. Thus there will be assurance that as the rapidly rotating cutter advances, it will not strike the end of the gear tooth and start taking a substantial cut.

As shown in Fig. 10 current is supplied from a suitable source 50 through main supply switch 51 to a transformer 52 having a secondary winding connected to supply leads 53 and 54 of the control circuits. Direct leads from the main supply are lettered a, b and c. Connections to these direct leads have been correspondingly lettered in the body of the diagram. The main supply is also connected, as shown, to the cutter spindle motor 18 and to the work head motor 28. 55 designates a slide solenoid which, when energized, operates a supply valve in one direction to permit fluid to move into the right hand end of the cylinder 23 thus advancing the cutter head towards working position. 56 designates a solenoid which when energized operates a supply valve in one direction to permit flow of fluid to a hydraulic cylinder to move the work clamp rod to secure the work against the work carrying flange of the work head. 57 designates a coolant pump motor which supplies cooling fluid to the gears and cutters. This coolant flow travels through coolant pipe 58 shown in Figs. 1 and 2. 59 designates a hydraulic pump motor that supplies fluid under suitable pressure for operating the hydraulic supply to the cylinder 23 and the cylinder that cooperates with the work clamp rod of the work head. These several motors and solenoids are controlled by switches arranged in their circuits as will be described.

Having positioned a workpiece on the work head the operator closes switch A manually thus completing a circuit from supply line 53 through normally closed stop switch B and through a winding 59a to line 54. Winding 59a closes supply switches 59A thus energizing motor 59 to obtain suitable hydraulic pressure and energizes the coolant motor 57. Winding 59a also closes a holding switch 59A' across the switch A so that the switch A need only be closed momentarily, switch 59A' holding the circuit closed. The operator then closes switch D so that a circuit is completed from line 53 through switch 59A', through switch D and normally closed stop switch E, winding 18a to line 54. Winding 18a, when energized, closes switch 18A to energize the cutter spindle motor 18, also closing switch 18A' providing a holding connection across switch D.

Having energized the cutter spindle the operator closes switch G, thus completing a circuit across leads 53' and 54 through a normally closed stop switch H and coil or relay 56a which energizes switch 56A to energize the valve controlling clamp solenoid 56 thus securing the workpiece in fixed position on the work head spindle. Coil 56a also energizes switch 56A' forming a holding circuit around switch G.

Next the operator closes switch M completing a circuit from lead 53', closed switch 18A', switch M, normally closed stop switch N, lead wires 61 and 62, energizing windings 55a, 60a and the timing unit 65. Previously the operator has set the contacts of a selector switch 67 into their normal full cycle operative positions as shown in full lines in Fig. 10 although this selector switch can be controlled to cut out one or several of its controls to provide for selective operation in case of initial setup. When the coil 55a is energized it energizes switch 55A to energize the slide solenoid 55 and give a supply of fluid to the cylinder 23 and advance the cutter spindle to the work. When the cutter head reaches its work position it automatically closes the limit switch K completing a circuit from the line side 53' through selector switch 67, lead wire 68 and winding 28a which energizes switch 28A in order that the work head motor 28 may then start in a forward direction. Coil 60a which is a solenoid, when energized as previously mentioned controls its plunger to operate a coolant valve to start the coolant flow to the work. The timing unit 65 includes a coil which closes normally opened switches 65A', 65A² and opens normally closed switch 65A³, the former two switches being arranged in a holding circuit across the switch M. Closed switch 65A² also functions to maintain a circuit through the coil 56a to thus render the unclamp or stop switch H ineffective until the chamfering operation is completed. The timing unit 65 operates after a predetermined time interval to open its own circuit and deenergize the switches 65A' and 65A². Any suitable timing unit 65 can be used for this purpose so its details need not be described here, its function being to maintain its own operations for a sufficient time interval for one complete revolution of the work head spindle. After such a time interval the timing unit deenergizes itself and automatically resets itself, and when deenergized it deenergizes the switches 65A' and 65A² which interrupts the flow of current through coils 55a, 60a, and its own circuit.

When coil 60a is deenergized it closes the coolant valve to stop the coolant flow. When coil 55a is deenergized it reverses the solenoid valve 55 to supply fluid under pressure to the left hand side of the cylinder 23 to retract the cutter head. As soon as the cutter head starts to retract it opens the microswitch K through which current is supplied to the winding 28a. At this time, however, the work head motor 28 continues to run since coil 28a is energized through the microswitch 28A' closed by coil 28a. It is not until the end of one cyclic step in the operation of the work head that microswitch J is opened by its controlling cam at a predetermined position of the work when two gear teeth are approximately at equal distances from the axes of the cutter. Thus the cam 41 will open switch J and deenergize winding 28a and as soon as this occurs it will close a switch 28A² which was previously opened by the energization of coil 28a, thus completing a circuit from lead 53' through the zero switch 38 and through the reverse winding 28b which immediately energizes switch 28B and reverses the direction of motor operation temporarily and instantaneously. The zero switch has a switch contact when stationary keeps a centered position but as long as the switch 38 is rotating in forward drive it holds the switch blade in the position shown in Fig. 10. Upon reversal in the direction of rotation, since it is controlled by the motor drive shaft 37, the switch 38 will cause the motor to reverse and then stop instantly by opening the circuit through winding 28b.

As will be apparent, the motor that drives the work head is thus automatically stopped when the cutter axis is between a pair of adjacent teeth on the work and this stop takes place at a predetermined point in the cycle in the gear chamfering operation after the completion of the entire workpiece. Thus a new workpiece applied to the work head will be positioned so that the cutter axis is between a pair of adjacent teeth and since the work does not start rotating until the cutter spindle is fully advanced, the cutter spindle can not strike the end of a gear tooth and thus take a heavy cut during its advance into work position. Furthermore, as will be apparent, the electrical connections are such that it will be impossible for the operator to start the work head until the workpiece is clamped and until the cutter spindle is operating. The interlocking controls provide assurance that the cutter spindle is rotating before the work rotation begins so that damage to the tool is avoided.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A gear chamfering machine having a base provided with a work head having a rotatable work carrying spindle and having a cutter head provided with a rotatable cutter spindle, work locating means on the work head spindle, means for rotating the work head spindle and for advancing and retracting the work head spindle during and in timed relation to its rotation, timing means for conditioning a stopping means after a revolution of the work spindle, means for advancing the cutter spindle to a predetermined position, an energizing switch controlled by the cutter head at the end of its advancing stroke, means controlled by said energizing switch to start rotation of the work head spindle, stopping means effective only after being conditioned by said timing means for stopping the work head spindle at a predetermined position in the work head cycle, and means driven in timed relation to the work head spindle for operating said stopping means each time a tooth of the gear being chamfered reaches a predetermined position with respect to the cutter axis.

2. A machine for shaping the ends of gear teeth comprising a frame, a cutter head, means for moving the cutter head on said frame into and out of work engagement position, a work head having a work spindle, clamping means for holding a workpiece on said spindle, drive means for rotating said spindle, means automatically operable to energize the work head drive to initiate work rotation upon movement of the cutter head to a predetermined work engaging position and means for rendering said automatically operable means ineffective unless the clamping means has been moved to work clamping position.

3. A machine for shaping the ends of gear teeth comprising a frame, a cutter head, means for moving the cutter head on said frame into and out of work engagement position, a work head having a work spindle, clamping means for holding a workpiece on said spindle, drive means for rotating said spindle, means automatically operable to energize the work head drive to initiate work rotation upon movement of the cutter head to a predetermined work engaging position and means for rendering said automatically operable means ineffective unless the clamping means has been moved to work clamping position and unless the cutter spindle drive means has been energized.

4. A machine for cutting the ends of gear teeth comprising a frame, a cutter head having a cutter spindle, drive means for said cutter spindle, means for moving the cutter head on said frame axially into and out of cutting position, a work head on said frame having a rotatable spindle mounted for axial movements, a work head drive having means for moving the work head spindle axially and rotationally through successive cycles of movement, means automatically operable to initiate work rotation upon movement of the cutter head to a predetermined cutting position, a cam operated switch and means for operating said switch controlled by the work head drive each time a tooth of the work gear has rotated a distance equal to the tooth spacing and automatically operable to stop the work head drive at a predetermined point in each cycle of work head movements, and timing means for rendering said cam operated switch ineffective until a complete revolution of the work has taken place.

5. A gear chamfering machine having a base provided with a work head having a rotatable work carrying spindle and having a cutter head provided with a rotatable cutter spindle adapted to carry a milling cutter, work locating means on the work head spindle, drive means for rotating the work head spindle, means for relatively moving the work head spindle and the cutter head in the direction of the work head spindle axis during and in timed relation to the rotation of the work head spindle, means independent of the work head drive means for rotating the cutter head spindle, timing means, an electric circuit energized by said timing means after a predetermined time interval and stopping means periodically operable in accordance with the work gear teeth spacing for stopping the work head spindle after energization of said circuit and at a predetermined position in the cycle of its movements so that the cutter spindle axis is aligned with the space between a pair of teeth on the work, means for advancing the cutter spindle in the direction of the cutter spindle axis to a predetermined working position and means for initiating rotation of the work spindle after the advancing movement of the cutter spindle has been completed.

6. A machine for shaping the ends of gear teeth comprising a frame, a cutter head operably mounted on said frame and adapted to carry and rotate a cutter, means for moving the cutter head into and out of work engagement position, a work head on said frame having means for holding and operating a workpiece through cycles of axial and rotational movements, a work head drive for said holding and rotating means, switch means automatically controlled by said cutter head and automatically operable to energize the work head drive to initiate work rotation upon movement of the cutter head to a predetermined work engaging position, a timing cam having a driven connection to the work head drive, a cam operated switch controlled thereby for operation each time a tooth of the work moves a distance equal to the tooth spacing and reaches a predetermined position, timing means automatically operable after a time interval sufficient for a complete rotation of the work, and a circuit controlled by said timing means including said switch and effective only when the cam operated switch is closed for automatically immediately stopping the work head drive at a predetermined position in its cycle of movements such that the cutter head is arranged substantially midway between adjacent teeth on the work.

References Cited in the file of this patent

UNITED STATES PATENTS

| Number | Name | Date |
|---|---|---|
| 1,680,083 | Blades et al. | Aug. 7, 1928 |
| 2,139,154 | Galloway | Dec. 6, 1938 |
| 2,174,783 | Fish | Oct. 3, 1939 |
| 2,201,500 | Poock | May 21, 1940 |
| 2,217,671 | Coffin et al. | Oct. 15, 1940 |
| 2,276,627 | Poock et al. | Mar. 17, 1942 |
| 2,395,544 | Galloway | Feb. 26, 1946 |
| 2,424,271 | Galloway | July 22, 1947 |
| 2,433,201 | Cross | Dec. 23, 1947 |